United States Patent [19]
Buning

[11] 3,821,174
[45] June 28, 1974

[54] CROSS-LINKED SHAPED OBJECTS OF VINYL CHLORIDE POLYMERS

[75] Inventor: Robert Buning, Troisdorf-Sieglar, Germany

[73] Assignee: Dynamit Nobel Aktiengesellschaft, Troisdorf, Germany

[22] Filed: Oct. 2, 1972

[21] Appl. No.: 294,123

Related U.S. Application Data

[63] Continuation of Ser. No. 57,772, July 23, 1970, abandoned.

[52] U.S. Cl........ 260/80.71, 260/31.6;, 260/41 AG, 260/45.75 K, 260/46.5 R, 260/77.5 UA, 260/78.5 R, 260/87.5 R, 260/827
[51] Int. Cl............................................. C08 11/04
[58] Field of Search..................... 260/80.71, 87.5 R

[56] References Cited
UNITED STATES PATENTS
3,423,376  1/1969  Gobran et al...................... 260/80.3

*Primary Examiner*—Stanford M. Levin
*Attorney, Agent, or Firm*—Frank M. Murphy

[57] ABSTRACT

Cross-linked vinyl chloride polymers are produced by employing as the linear vinyl chloride polymer a co-polymer of vinyl chloride and a silane and effecting the cross-linking by contacting the linear polymer with hydrochloric or nitric acid. Premature cross-linking, i.e. cross-linking before final shaping of the desired article such as filament or sheet, can be avoided by use of the process of the invention.

15 Claims, No Drawings

CROSS-LINKED SHAPED OBJECTS OF VINYL CHLORIDE POLYMERS

This is a continuation of application Ser. No. 57,772 filed July 23, 1970 now abandoned.

BACKGROUND

It is in the prior art to cross-link vinyl chloride polymers by chemical means. For example, cross-linking is brought about by diamines in U.S. Pat. No. 2,514,185. The diamines, however, react even under the conditions prevailing while the polymers are being worked, so that the reduction of flow due to cross-linking renders shaping impossible, or possible only with a simulataneous decomposition of the vinyl chloride polymers.

In U.S. Pat. No. 3,017,379 a description is given of cross-linking by the use of peroxides. But even in the procedure a partial cross-linking takes place even before the shaping process begins, resulting in the same disadvantage described above. This is especially true where PVC is being fabricated without plasticizer. The introduction of double bonds, according to British Pat. No. 618,902 for example, leads to the same negative results.

One method which avoids this disadvantage is the radiochemical cross-linking of shaped objects of polyvinyl chloride, such as described in J. Chim. Phys. 53, 895, (1956). This method however, entails technical disadvantages. For example, special safety precautions must be taken to prevent radiation damage. Furthermore, the irradiation of products of large surface area is especially difficult, because radiation sources of this kind are technically very difficult to come by.

THE INVENTION

Now, the subject of the invention is a process of the crosslinking of shaped polymer objects containing vinyl chloride, which before, during and after the shaping process may contain no or substantially no cross-linked vinyl chloride polymers, and it is characterized by the fact that one uses as vinyl chloride polymers copolymers containing, copolymerized into the copolymer, (in the polymer chain), vinyl chloride, in some cases additional ethylenically unsaturated compounds, and silanes of the general formula

(I)

wherein X represents a polymerizable radical which becomes part of the polymer chain, and $R^1$, and $R^2$ is each the same or different alkyl, aryl, alkoxy, or aryloxy, and $R^3$ is the same or different alkoxy or aryloxy, and the formed bodies are treated with hydrochloric acid baths or nitric acid baths containing additional acids in some cases, at suitable temperature e.g. 0°C. to 150°C.

The alkyl radicals and alkyl moieties of the alkoxy radicals can be straight-chained, branched or cyclic radicals having desirably one to 18 carbon atoms, preferably 4–18 carbon atoms. Desirably, the total number of carbon atoms in $R_1$, $R_2$ and $R_3$ is up to about 48. The aryl radicals and the aryl moities of the aryloxy radicals are preferably mononuclear radicals, e.g. phenyl.

X can be an ethylenically unsaturated radical, preferably a hydrocarbon radical of $C_2$–$C_4$, e.g. vinyl or allyl or other short chain unsaturated radical. It is best if it contains only one functional group, especially a group of ethylenic unsaturation.

An additional subject of the invention is products made by this process.

It has surprisingly been found that formed bodies made of these copolymers can be cross-linked in a simple manner in acid, mostly aqueous acid baths.

The formed bodies prepared by the process may contain, in addition to the vinyl chloride-silane copolymers, additional polymers which are added to the copolymers before the cross-linking.

In particular, sheets of fibers are formed bodies which can be produced by the process of the invention. It is advantageous to form sheets or fibers from emulsions, solutions or melts with simulataneous stretching and cross-linking in acid baths.

In general, formed bodies of any desired shape can be made by methods conventionally used for thermoplastic shaping.

The invention is based on two points:
a. The preparation and compounding of the vinyl chloride copolymers and
b. the cross-linking of the formed bodies made therefrom. These points will be further explained separately.

VINYL CHLORIDE-SILANE COPOLYMERS

The copolymerizable silanes used have the following structure:

(II)

wherein X represents a polymerizable radical which can be a short-chained unsaturated hydrocarbon radical, e.g., the vinyl radical $H_2C=CH-$ or the allyl radical $H_2C=CH-CH_2-$, and $R^1$, $R^2$ and $R^3$ can be identical or different saturated alkyl radicals which may be straight-chained, branched or cyclic, or aryl radicals.

In the copolymerizable silanes named, one or two OR groups can also be replaced by the above-mentioned alkyl radicals and/or aryl radicals, so that the following structure results, in which only one or two additional Si-C bonds are present:

(III)

Of the straight-chained, branched or cyclic alkyl radicals, of special interest are those having one to 18 carbon atoms, and of the aryl radicals, radicals of benzene and its homologs are of special interest. Said aryl radicals may be substituted in some cases. In (III), $R^1$, $R^2$ and $R^3$ are as in (II).

These vinyl chloride-silane copolymers are thermoplastically workable and do not cross-link while they are being made into formed bodies under thermoplastic conditions.

The copolymers according to the present invention are not cross-linked and are excellently suited to shaping steps on account of their thermoplastic workability. The preparation of formed bodies from the polymers is performed with conventional machinery, with the addition, if desired, of plasticizers, filler, pigments, heat stabilizers or lubricants. It is also practical to form the shaped bodies from solutions of the polymers.

METHOD

The vinyl chloride-silane copolymerization can be performed using known polymerization processes, including solution polymerization or precipitation polymerization in the aqueous phase, in the presence of organic solvents, or by polymerization in substance by which is meant with little or no solvent or diluent.

In general, the polymerization is performed by conventional emulsion or suspension polymerization in the aqueous phase. In the case of polymerization in aqueous phase, it is preferable to operate at a pH of about 7.0, in order to prevent unnecessary hydrolysis at higher or lower pH values.

If catalysts are used which change the pH of the bath during the polymerization, buffers are used. Suitable buffer substances are mixtures of primary and secondary orthophosphates, or alkali salts of weak acids such as carbonates, borates, acetates, etc.

Methyl cellulose, gelatine, water-soluble starch, salts of polyacrylic or polymethacrylic acid, etc., can serve as suspension stabilizers.

Suitable emulsifiers are aryl, alkyl and fatty alcohol sulfonates, salts or esters of fatty acids, etc.

Very sensitive silanes are copolymerized with vinyl chloride by in substance polymerization methods, without the use of water or solvents, including the two-step process of French Pat. No. 1,427,936.

If rolling autoclaves containing steel balls or stirrers acting on the periphery are used, the polymers are obtained in powder form.

Sensitive silanes of this kind are, for example, vinyl trimethoxysilane or vinyl triethoxysilane, and the corresponding allyl compounds whose copolymers are partially or wholly-cross-linked even by the access of moisture during the polymerization and can no longer be worked into shaped objects. But if moisture is excluded, non-cross-linked copolymers are formed.

The proportion of the silanes in the total of the monomers is unrestricted and can amount to as much as 70 percent by weight. In the meaning of the invention, however, it is sufficient and therefore desirable to use up to 30 percent silanes by weight (same basis). Preferably silanes amounting to from 0.1 to 15 percent of the weight of the monomers which are used.

The polymerization temperature can range from −60°C to 100°C. Below 0°C eutactic copolymers are obtained. Low-temperature polymerization can be performed in aqueous phase using antifreezes, such as monovalent or polyvalent alcohols, or it is preferably performed as a polymerization in substance.

The processes and process conditons suitable for the copolymerization of the silanes, however, are not restricted to those listed.

CATALYST

The catalysts which are known to be suitable for the particular polymerization process and for the polymerization temperature are used. For example, peroxide catalysts such as hydrogen peroxide, alkyl peroxides, acid peroxides and ketoperoxides are suitable, or redox catalysts composed, for example, of heavy metal salt plus peroxide plus a reducing agent, such as iron sulfate plus hydrogen peroxide plus ascorbic acid; also, metal alkyls such as lithium alkyls, aluminum trialkyls, boron trialkyls, etc., which are used together with peroxides in some cases. Redox catalysts and metal alkyls are especially suitable for low-temperature polymerization below −10° to −60°C.

OTHER MONOMERS

The copolymerization can be performed in the presence of additional ethylenically unsaturated monomers which are copolymerizable with vinyl chloride, the total amount of such additional monomer being any desired amount, e.g. up to 65 percent by weight, but preferably to from 0.1 to 30 percent by weight based on the total weight of monomers. It is best for the vinyl chloride to amount to at least 30%, better at least 50 percent, of the weight of the monomer mixture.

Such monomers are, for example, vinyl esters (vinyl acetate, vinyl propionate, vinyl stearate etc.), acrylic esters (ethyl ester, propyl ester, cetyl ester etc.), maleic or fumaric esters (methyl, ethyl, dodecyl, and cetyl ester,), itaconic esters (methyl ester, dodecyl esters etc.), ethylene, propylene, butylene, acrylonitrile, methacrylonitrile, vinylidene chloride, or monomers of similar composition.

CROSS-LINKING OF THE FORMED BODIES

Surprisingly, it has been found that formed bodies made from the above-named copolymers, which can be made by methods, utilizing the thermoplastic property of the polymers, can be cross-linked in acid, aqueous baths, although the hydrophobic character of vinyl chloride polymers ought not to permit this.

The formed bodies can be suspended or laid in the cross-linking bath or can be continuously drawn through it.

The cross-linking baths consist generally of dilute or concentrated strong acids, especially hydrochloric or nitric acid, at any suitable concentration, concentrations of 10 to 40 percent by weight being preferred. Surprisingly, hydrochloric acid gives the best results, and sulfuric acid alone is ineffectual. Hydrochloric or nitric acid baths, however, can additionally contain other acids such as sulfuric acid, or other strong or weak acids.

Temperatures in the cross-linking processes can be between 0°C and 150°C, preferably between room temperature and 130°C.

THE FORMED BODIES

Formed bodies according to the invention are to be understood as structures of any shape, which can be elongated equally in any direction.

The formed bodies can be fibers, filaments, bands or strips, as well as thread, fabrics, felts or meshes made therefrom, or flat structures such as sheets or boards, or predominantly three-dimensional structures such as technical shaped bodies of all kinds, hollow bodies, containers, bottles, pipes, etc.

The formed bodies can be of considerable thickness by which is meant, shortest cross-sectional dimension. The thickness of sheets or diameter of cylindrical forms can be up to 6 mm, preferably 4 mm. Best results are realized with smaller thicknesses, e.g. up to 1,000 microns, desirably up to 200 microns.

There are no restrictions in regard to the manufacturing processes, the shaping and the surface treatment of the formed bodies.

The formed bodies are suitable for use in services where there is a need for resistance to acids and boiling solvents, resistance to chemicals generally, resistance to boiling temperatures and reduced tendency to deform at high temperature, and high strength characteristics, especially high tensile strengths at elevated temperatures. The products can be used in services wherein known cross-linked vinyl chloride polymers are used.

Further, the formed bodies of the invention can be used in new applications, because the present cross-linking process can be performed in a technically simple manner on the formed bodies themselves, no matter what dimensions they may possess, a high degree of cross-linking being surprisingly obtained.

The cross-linking performed according to the present invention on formed structures is especially advantageous also because the cross-linking can be performed in a controlled manner by the copolymerization on the one hand and by the cross-linking mechanism on the other. The cross-linking density can be predetermined by the controlled incorporation of the polymerizable silane compound and the quantity thereof. By the cross-linking mechanism, and in some cases also by only partial cross-linking, the individual macromolecules are fixed at the point predetermined by copolymerization, and they can thereby be given a "semi-crystalline" structure.

As it will be seen in the experimental part of this specification, the cross-linking is performed with surprising speed. Sheets and fibers can be transformed to the cross-linked state within minutes. In the case of shaped bodies of greater thickness, such as boards, they can be cross-linked in relatively short—unexpectedly short—periods of time. This rapidity of the cross-linking process makes it possible, for example, to coat formed bodies with only a thin layer of cross-linked material without impairing the surface gloss of the bodies. The thickness of the skin can be predetermined, as it will be shown in the experimental part.

CONTROL OF CROSS-LINKING

The cross-linking of the formed bodies and their characteristics can be controlled in a desirable manner, which has been impossible in the past with vinyl chloride polymers:

1. Through the structure and quantity of the silanes. Particularly in this manner is it possible to determine in advance the number of cross-links (cross-linking density) that form under the conditions created.

2. Through the copolymerization behavior of the silanes it is possible to prepare uniformly structured copolymers in which the silanes are distributed in all polymer chains with substantially equal regularity and thus produce a uniform cross-linking, or to prepare heterogeneously structured copolymers in which individual sections of the polymer chains or individual chains contain a larger number of silane molecules which then produce a greater cross-linking density at these points.

For a given chemical structure of the silane involved, a unifrom or heterogeneous structure of the copolymer can be brought about during the polymerization by, respectively, an unchanging or varying monomer composition.

3. Through the cross-linking bath by control of temperature, pH, cross-linking time etc.

4. Through the incorporation of the above-mentioned, ethylenically unsaturated monomers which can be copolymerized with vinyl chloride.

The cross-linking mechanism can also be influenced by the incorporation of copolymerizable monomers which can easily be hydrolyzed, such as alkylene carbonates or alkylene silyl esters, e.g. vinylene carbonate or vinyl silyl esters of the formula

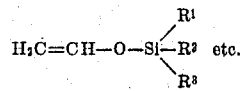

wherein $R^1$, $R^2$ and $R^3$ have the meanings stated therefor for (II).

5. Through the polymerization temperature. Low-temperature polymerization produces crystalline, syndiotactic copolymers which are given an additionally "ordered" structure by the cross-linking, with properties which have hitherto been unkown in vinyl chloride polymers (e.g. dissolving characteristics, shrinkage, reduced creep, etc.).

6. Through the use of plasticizers. The use of plasticizers facilitates the cross-linking of the formed bodies. Examples of plasticizers are phthalic acid esters (ethyl hexyl, dodecyl, stearyl etc.), adipic acid esters, azelaic acid esters, sebacic acid esters and polyesters of these acids formed, for example, with styrene, tricresyl phosphate, eopoxidized soybean oil, esters formed by pentaerythritol with monobasic fatty acids, chlorinated hydrocarbons, etc.

7. Through blending. The formed bodies can be further influenced by the addition of other polymers to the copolymers before the forming and cross-linking operations. Examples of suitable polymers are polyethylene, chlorinated polyethylene, copolymers of vinyl esters and ethylene, polypropylene, chlorinated polypropylene, syndiotactic and atactic polyvinyl chloride and chlorination products thereof, ABS polymers, MBS polymers, etc. The quantity of polymer added can amount to as much as 60 wt-percent of the mixture, preferably from 0.3 to 50 wt percent of the polymer mixture.

EMBODIMENTS

In the examples, embodiments are set forth without thereby indicating any limitation.

If the cross-linking experiments are performed with sulfuric acid (e.g. 20 wt-percent solution) or acetic acid (e.g. 40 wt-percent solution), no cross-linking occurs.

If, however, the copolymerization of vinyl chloride with vinyltrinonoxysilane, for example, is performed in a sulfuric acid aqueous suspension, the copolymers become cross-linked even while they are being manufactured. Surprisingly, however, as the examples show, formed bodies made from the above-named copolymers of vinyl chloride cross-link completely in a hydrochloric acid and/or nitric acid aqueous phase. The penetration of hydrochloric acid or nitric acid into formed bodies of vinyl chloride, as it occurs in the following examples, was not to be expected according to the state of the art.

An example of a cyclic group for $R^1$, etc. is cyclohexyl, for formula (I).

As linear polymers are named such which are produced by polymerization processes and are not or not in a considerable amount containing bridges of cross-linking between the polymer molecular and which therefore are plastic.

EXAMPLES

The following examples 1 to 4 represent the preparation of the polymers which, in the examples under B, result in cross-linked products.

The composition of the monomer mixtures will be as stated for the polymer in the examples given under B.

A. Preparation of the Copolymers

1. Suspension process 420 grams of desalted, oxygen-free water, 19 ccm of a 3 percent aqueous methyl cellulose solution, 1.43 g of dilauroyl peroxide, and 220 g of monomer mixture are stirred in a 1-liter glass autoclave with a propeller stirrer (500 rpm). After 21 hours the autoclave is vented and the finely granular copolymer is centrifuged and dried at 50°C in a current of air.

2. Emulsion process 440 g of water, 6.4 g of potassium dodecyl sulfonate as emulsifier, 0.5 g of $K_2S_2O_8$, a mixture of 2.2 g of $NaH_2PO_4$ and 8.8 g of $Na_2HPO_4$ as buffer, and 220 g of monomer are stirred with a blade stirrer (200 rpm) in a one-liter glass autoclave. After a polymerization time of 12 hours at 50°C, the emulsion is precipitated with a 10 wt-percent NaCl solution, washed with water, and dried at 50°C. Hydrogen peroxide or other water-soluble peroxides are usable as catalysts with equal success.

The emulsions can be used as they are, for example as adhesives or for the preparation of coatings on plastic objects or metals. To this end the emulsion can be stabilized with 2 wt-percent of cetyl alcohol, for example, and can be mixed with plasticizers if desired. The emulsions can also be cross-linked in acid precipitation baths, with simultaneous stretching if desired, and can be made into filaments and spun.

3. Polymerization in substance 250 g of monomer mixture and 0.25 g of azoisobutyric acid dinitrile are mixed in a one-liter glass autoclave with a spiral band agitator acting on the periphery (200 rpm). After 10 hours at 53°C, a fine copolymer powder is obtained.

When the silane comonomer content is more than 6 percent by weight, the copolymerization is best performed at low temperatures (e.g., at −35°C with $B(C_2H_5)_3$-t-butylhydroperoxide).

4. Low Temperature Copolymerization 330 g of monomer mixture, 600 cc of methanol, 2 cc of hydrogen peroxide (solution of 30 percent by weight), 1.2 g of ascorbic acid and 2 cc of a 1 wt-percent iron sulfate solution are stirred at −20°C in a 750 cc glass vessel having a paddle stirrer; after 15 minutes the slurry that forms is poured into cold methanol of −60°C temperature and filtered. The product is dried at 50°C. A sterically arranged, crystalline copolymer is obtained. The experiment can also be performed as in Example 3 using an autoclave with a band agitator acting on the periphery, or in rolling autoclaves containing steel balls, to achieve higher yields (over 80 percent).

Ternary copolymerization can be performed in like manner with the additional ethylenically unsaturated compounds named above.

The polymerization conditions of Examples 1 to 4 can be varied in known manner, as described in the technical literature.

B. Examples of Cross-Linking

For the preparation of the formed bodies of the following examples, copolymers were used which were prepared according to Example A-1 to 3.

Preparation of Sheets

Thin sheets of, for example, 20 microns thickness were cast from a 20 percent solution of the copolymers in tetrahydrofuran. Thicker sheets of, for example, 100 microns thickness, as well as boards, were prepared by thermoplastic methods.

The cross-linking was performed according to the following examples.

For the determination of the cross-linking, the sheets were stored in hydrofuran for 3 days at room temperature. The following cross-linking rating system was introduced: sheet dissolves =0; sheet breaks up but undissolved particles remain = slightly cross-linked = 1; sheets sag, but retain their shape = moderately cross-lined = 2, sheets keep their shape = strongly cross-linked = 3; in other words, the degree of cross-linking increases from 0 to 3.

1. Cross-linking of a copolymer of vinyl chloride and vinyl trinonoxysilane (2 wt-percent copolymerized silane), sheet thickness 22 microns:

The sheet is held at 50° C in concentrated hydrochloric acid for 2 to 12 minutes and cross-linked to the degree stated below.

Table 1

| Time in minutes | Degree of Cross-linking |
|---|---|
| 2 | 0 |
| 4 | 1 |
| 6 | 2 |
| 8 | 3 |
| 10 | 3 |
| 12 | 3 |

2. The experiment of Example B-1 was repeated, except that the copolymer consisted of 90 wt-percent vinyl chloride, 8 wt-percent vinyl acetate and 2 wt-percent vinyl trinonoxysilane.

Table 2

| Time in minutes | Degree of Cross-linking |
|---|---|
| 2 | 1 |
| 4 | 2 |
| 6 | 3 |
| 8 | 3 |
| 10 | 3 |
| 12 | 3 |

The cross-linking reaction is promoted by the incorporation of vinyl acetate into the copolymer.

3. The following shows the relationship between the cross-linking reaction in copolymers of vinyl chloride and various contents of vinyl trinonoxysilane.

Table 3 shows the results obtained with 20 micron sheets, which were treated at 60°C for various periods of time with 20 wt-percent hydrochloric acid.

Table 3

| Wt-% of silane in the copolymer | Cross-linking time in minutes | Degree of cross-linking |
|---|---|---|
| 9 | 2 | 0 |
| 9 | 4 | 2 |
| 9 | 8 | 3 |
| 9 | 12 | 3 |
| 8 | 2 | 0 |

Table 3-Continued

| Wt-% of silane in the copolymer | Cross-linking time in minutes | Degree of cross-linking |
| --- | --- | --- |
| 8 | 4 | 1 |
| 8 | 8 | 2 |
| 8 | 12 | 3 |
| 6 | 2 | 0 |
| 6 | 4 | 0 |
| 6 | 8 | 2 |
| 6 | 12 | 3 |

4. The cross-linking experiments were performed the same as in Example B-3, except that the cross-linking was performed in concentrated hydrochloric acid at 20°C.

Table 4

| Wt-% of silane in the copolymer | Cross-linking time in minutes | Degree of cross-linking |
| --- | --- | --- |
| 9 | 5 | 3 |
| 9 | 30 | 3 |
| 6 | 5 | 3 |
| 6 | 30 | 3 |
| 2 | 5 | 0 |
| 2 | 30 | 1 |

5. If the copolymer containing 2 wt-percent of copolymerized silane is cross-linked in concentrated hydrochloric acid at 40°C instead of 20°C, the results given in Table 5 are obtained.

Table 5

| Cross-linking time in minutes | Degree of Cross-linking |
| --- | --- |
| 4 | 0 |
| 8 | 1 |
| 12 | 3 |

Similar results are obtained in the cross-linking of sheets of a thickness of 100 microns and of injection-molded, thinwalled hollow bodies.

6. Cross-Linking Experiments on 4 mm Sheet Material

The copolymer was rolled for 20 minutes at 165°C with the addition of 2 wt-percent of 17 M tin stabilizer. The "hide", still hot from the roll, was pressed for 2 minutes at 185°C to form a 4 mm sheet.

A 4 mm sheet made of a copolymer of vinyl chloride and vinyl trinonoxysilane (5 wt-percent) was boiled at 110°C in 20 percent hydrochloric acid solution. In each case, sections 50 microns thick were cut with a microtome and tested for their degree of cross-linking. The results are given in Table 6.

The 17M stabilizer is of the formula $(N-C_4H_9)_2 Sm(S-CH_2-COOC_8H_{17})$.

Table 6

| Cross-linking time in minutes | Microtome section | Degree of cross-linking |
| --- | --- | --- |
| 0 | 0 – 2000 | 0 |
| 12 | 0 – 150 | 3 |
|  | 150 – 1000 | 1 |
|  | 1000 – 2000 | 0 |
| 24 | 0 – 350 | 3 |
|  | 350 – 1000 | 2 |
|  | 1000 – 2000 | 1 |
| 180 | 0 – 350 | 3 |

Table 6—Continued

| Cross-linking time in minutes | Microtome section | Degree of cross-linking |
| --- | --- | --- |
|  | 350 – 1000 | 3 |
|  | 1000 – 2000 | 2 |

7. A sheet (18 μ thick) of a copolymer of vinyl chloride and vinyl trinonoxysilane (7 wt-percent) is immersed in concentrated hydrochloric acid at 20°C. Table 7 lists the tensile strengths in relation to the cross-linking time.

Table 7

| Cross-linking time in minutes | Tensile strength in $kp/cm^2$ |
| --- | --- |
| 0 | 410 |
| 5 | 600 |
| 10 | 620 |
| 30 | 610 |

8. Mixtures were prepared from a copolymer of vinyl chloride and vinyl trinonoxysilane (5 wt percent silane) and the following components and made into pressed sheets 4 mm thick.

a. 100 wt-percent copolymer (for comparison)
b. 70 wt-percent copolymer and 30 wt-percent glass fibers (3 mm staple fibers)
c. 70 wt-percent copolymer and 30 wt-percent diethylexylphthalate.
d. 50 wt-percent copolymer and 50 wt-percent postchlorinated atactic PVC (66.5 wt-percent chlorine content)
e. 70 wt-percent copolymer and 30 wt-percent postchlorinated high-pressure polyethylene (chlorine content 39.8 wt-percent)
f. 60 wt-percent copolymer and 40 wt-percent syndiotactic polyvinyl chloride (72 percent syndiotactic, determined according to "Makromolekulare Chemie" 60 (1963) 106–119)
g. 60 wt-percent copolymer and 40 wt-percent atactic polyvinyl chloride (K value 68).

Precisely weighed specimens of the sheets were boiled for three hours in 20 percent hydrochloric acid. For the determination of the cross-linking, the sheets thus treated were boiled in tetrahydrofuran, and the percentages of soluble and insoluble material were determined. The results are given in Table 8.

Table 8

| Specimen | Insoluble wt-% | Soluble wt-% |
| --- | --- | --- |
| a | 94.2 | 5.8 |
| b | 71.0 | 29.0 |
| c | 69.5 | 30.5 (Plasticizer) |
| d | 27.2 | 72.8 |
| e | 68.8 | 31.2 |
| f | 56.6 | 43.4 |
| g | 57.9 | 42.1 |

The vinyl chloride-silane copolymers, therefore, even when mixed with additional polymers, are transformed into wholly or largely cross-linked copolymers.

The copolymer of this sample was produced by Example A4. 9.

Sheets (24 microns thick) of a copolymer of vinyl chloride and vinyl tri-t-butoxysilane (10 wt-percent) are immersed at 20°C in concentrated hydrochloric acid and at 110°C in a 20 wt-percent solution of hydrochloric acid. The results are given in Table 9.

Table 9

| a) Cross-l. time 20°C, conc. HCl, in minutes | b) Cross-l. time 110°C, 20% HCl, in minutes | Degree of cross-linking | |
|---|---|---|---|
| | | a | b |
| 2 | 2 | 0 | 0 |
| 4 | 4 | 0 | 1 |
| 6 | 6 | 1 | 1 |
| 8 | 8 | 1 | 2 |
| 10 | 10 | 1 | 2 |
| 12 | 12 | 2 | 3 |

10. Sheets 30 microns thick were prepared from vinyl chloridevinyl trialkoxysilane copolymers, containing in each case 5 wt-% of copolymerized silane having the following alkyl chains:

a. $n-C_5$ b. $n-C_6$ c. $n-C_8$ d. $iso-C_8$ e. $n-C_{16}$

The sheets were immersed for varying periods in 20 wt-percent solution of hydrochloric acid at 60°C. The results are given in Table 10.

Table 10

| Copolymer | Cross-linking time minutes | Degree of cross-linking |
|---|---|---|
| a | 8 | 3 |
| | 12 | 3 |
| b | 8 | 2 |
| | 12 | 3 |
| c | 8 | 1 |
| | 12 | 3 |
| d | 8 | 1 |
| | 12 | 2 |
| e | 8 | 0 |
| | 12 | 2 |

11. Example 10 is repeated, but instead of the vinyl silanes corresponding amounts of the allyl silanes are used.

Table 11

| Copolymer | Cross-linking time minutes | Degree of cross-linking |
|---|---|---|
| a | 8 | 2 |
| | 12 | 3 |
| b | 8 | 1 |
| | 12 | 3 |
| c | 8 | 1 |
| | 12 | 2 |
| d | 8 | 0 |
| | 12 | 1 |
| e | 8 | 0 |
| | 12 | 0 |

12. Sheets 20 microns thick, prepared from a copolymer of 95 wt-percent vinyl chloride and 5 wt-percent vinyl trinonoxysilane are immersed for 12 minutes in each case in dilute nitric acid.

Table 12

| $HNO_3$, 10 wt-% Temp. °C | $HNO_3$, 20 wt-% Temp. °C | Degree of cross-linking |
|---|---|---|
| 50 | — | 0 |
| — | 50 | 0 |
| 100 | — | 0 |
| — | 100 | 2 |

If additionally 10 wt-percent of sulfuric acid is added to the 10 wt-percent nitric acid, the degree of cross-linking (100°C cross-linking temperature) is 1.

13. 40-micron sheets are prepared from ternary copolymers of vinyl chloride, vinyl propionate and vinyl trinonoxysilane with a constant silane content of 2 percent by weight and varying contents of vinyl propionate, and are immersed for 4 minutes and 6 minutes in concentrated hydrochloric acid at 50°C. Table 13 gives the results.

Table 13

| Vinyl propionate wt-% | Cross-linking time in minutes | Degree of cross-linking |
|---|---|---|
| 0 | 4 | 1 |
| | 8 | 2 |
| 10 | 4 | 1 |
| | 8 | 3 |
| 30 | 4 | 2 |
| | 8 | 3 |
| 60 | 4 | 3 |
| | 8 | 3 |

14. A 20-micron sheet prepared from a copolymer of vinyl chloride and vinyl tri-t-butoxysilane (10 wt-percent) is clamped in a stretcher frame made of a material that is not attacked under the conditions of the experiment (postchlorinated PVC, 67.5 wt-% Cl), cross-linked by treatment with 20 wt-percent aqueous HCl for 10 to 60 minutes, and then dried.

To determine the cross-linking, the sheet was refluxed for 8 hours with trichloroethylene.

The different weight increases in trichloroethylene correspond to different cross-linking densities, but these all correspond to complete cross-linking, because after the tri-chloroethylene is removed with boiling methanol no weight loss is perceptible in the copolymer. In other words, there is no dissolution of the copolymer. In spite of the drastic treatment with solvents no embrittling of the sheets is produced. The sheets remain transparent and elastic and do not shrink.

For purposes of comparison, a homopolymer of vinyl chloride having equal K values of 68.0 is treated in the same manner. In this case dissolution occurs (weight loss of 32.1%) and the remainder of the shrunken sheet is brittle and crumbles in the hand. Table 14 gives the results.

Table 14

| Time (minutes) | Weight gain in $CCl_2=CHCl$ | Weight loss in $CCl_2=CHCl$ |
|---|---|---|
| 10 | 6.6% | — |
| 20 | 7.8% | — |
| 30 | 8.8% | — |
| 60 | 8.0% | — |
| Homopolymer | — | 32.1% |

15. A filament is spun through an 0.2 mm nozzle from a 25 wt-percent solution of a copolymer of vinyl chloride and vinyl trinonoxysilane (5 wt-percent copolymerized silane) into a spinning solution (80 wt-percent ethyl alcohol and 20 wt-percent water) at 55°C with simultaneous stretching. For the cross-linking the filament is treated for 12 minutes with boiling 20 wt-percent hydrochloric acid.

The untreated filament is soluble in tetrahydrofuran, while the treated filament is insoluble in tetrahydrofuran.

The treated filament is boiled for one hour in trichloroethylene. The absorption of trichloroethylene amounts to only 1.8 wt-percent. The filament retains its shape and does not agglomerate. The untreated filament, however, agglomerates and is no longer recognizable as a filament.

A treated filament 7 cm long is boiled for one hour in water. After the boiling its length is still 7 cm, and no agglomeration occurs.

16. Example 15 is repeated, except that a sheet of 0.03 mm thickness is formed in a slit die from the melt of the polymer of Example 15, and in the cross-linking bath ["im Vernetzungsbad"] it is stretched a. 3-fold monoaxially b. 10-fold monoaxially c. 4-fold biaxially d. 6-fold biaxially. The sheet has the same properties as the filament of Example 15.

17. Example 15 is repeated but the spinning solution contained an amount of 10 wt. percent of hydrochloric acid. The results were corresponding Example 15.

What is claimed is:

1. In a process of producing cross-linked vinyl chloride polymers wherein linear vinyl chloride polymers are cross-linked, the improvement which comprises:

a. employing as the linear vinyl chloride polymer a copolymer of at least 30% by weight of vinyl chloride and 0.1 to 30% by weight of a silane of the formula

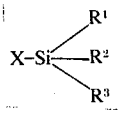

wherein:

X is an ethylenically polymerizable radical having from two to four carbon atoms, $R^1$ and $R^2$ is each alkyl having from one to 18 carbon atoms, aryl, alkoxy having from one to 18 carbon atoms or aryloxy, and $R^3$ is alkoxy having from one to 18 carbon atoms or aryloxy, the total number of carbon atoms in $R^1$, $R^2$, and $R^3$ being up to about 48 and b. cross-linking the linear vinyl chloride polymers by contacting them with aqueous hydrochloric or nitric acid or an aqueous mixture of hydrochloric and nitric acid, the aqueous acid being at least 10 percent by wt. of said acid, at a temperature of from about 0°C to about 150°C for a time sufficient and in an amount sufficient for the cross-linking.

2. Process according to claim 1, wherein:

X is an ethylenically unsaturated, monofunctional $C_2$ - $C_4$ radical $R^1$, $R^2$, and $R^3$ is each alkoxy having up to 18 carbon atoms.

3. Process according to claim 1 wherein the silane is 0.1 - 15 wt. percent of the vinyl chloride and silane monomers of the polymer.

4. Process according to claim 1 wherein said linear vinyl chloride polymer is a copolymer of vinyl chloride, said silane, and another ethylenically unsaturated monomer said another ethylenically unsaturated monomer being up to 30 percent by wt. of the vinyl chloride, silane and other ethylenically unsaturated monomer of the copolymer.

5. Process according to claim 2, wherein the silane is 0.1 - 15 wt. percent of the vinyl chloride and silane monomers of the polymer and the vinyl chloride is at least 50 percent by wt. of the vinyl chloride and silane monomers of the polymer.

6. Process according to claim 1, wherein the alkyl moieties of $R^1$, $R^2$ and $R^3$ are straight chain, branched chain or cyclic radicals having 1 - 18 carbon atoms.

7. Process according to claim 1, wherein the linear polymers compose a formed body which is a sheet or a fiber.

8. Process according to claim 1, said linear polymers having predominantly eutactic structure.

9. process according to claim 1, the acid being aqueous hydrochloric acid.

10. Process according to claim 1, the acid being aqueous nitric acid.

11. Process according to claim 9, the aqueous acid being 10–40 percent by wt. of said acid.

12. Process according to claim 10, the aqueous acid being 10–40 percent by wt. of said acid.

13. Process according to claim 1, wherein the linear polymers compose a formed body, and the formed body is contacted with the aqueous acid.

14. Process according to claim 9, wherein the linear polymers compose a formed body, and the formed body is contacted with the aqueous acid.

15. Process according to claim 10, wherein the linear polymers compose a formed body, and the formed body is contacted with the aqueous acid.

* * * * *

UNITED STATES PATENT OFFICE
CERTIFICATE OF CORRECTION

Patent No. 3,821,174    Dated June 28, 1974

Inventor(s) Robert Buning

It is certified that error appears in the above-identified patent and that said Letters Patent are hereby corrected as shown below:

Add a claim to priority based on Germany P 19 37 299.7, filed July 23, 1969.

Signed and sealed this 21st day of January 1975.

(SEAL)
Attest:

McCOY M. GIBSON JR.　　　　　　　　C. MARSHALL DANN
Attesting Officer　　　　　　　　　Commissioner of Patents